United States Patent [19]

Huryn

[11] 4,063,047
[45] Dec. 13, 1977

[54] KEY TELEPHONE SYSTEM MULTILINK HANDS FREE ANSWER CIRCUIT

[75] Inventor: William Andrew Huryn, Bricktown, N.J.

[73] Assignee: Bell Telephone Laboratories, Incorporated, Murray Hill, N.J.

[21] Appl. No.: 774,489

[22] Filed: Mar. 4, 1977

[51] Int. Cl.² .......................................... H04M 1/00
[52] U.S. Cl. ................................. 179/99; 179/1 HF; 179/81 B
[58] Field of Search ................... 179/1 HF, 99, 81 B

[56] References Cited

U.S. PATENT DOCUMENTS

| | | | |
|---|---|---|---|
| 3,743,791 | 7/1973 | Duff et al. | 179/81 |
| 3,787,640 | 1/1974 | Bush | 179/99 |
| 3,860,756 | 1/1975 | Shinoi | 179/1 HF |
| 3,872,262 | 3/1975 | Kerman | 179/99 |
| 3,898,392 | 8/1975 | Jackson | 179/99 |
| 3,904,834 | 9/1975 | Shinoi | 179/99 |
| 3,976,847 | 8/1976 | Bidlack et al. | 179/1 HF |
| 3,979,563 | 9/1976 | Kita | 179/99 |
| 4,010,332 | 3/1977 | Matheny | 179/99 |

Primary Examiner—Kathleen H. Claffy
Assistant Examiner—E. S. Kemeny
Attorney, Agent, or Firm—David H. Tannenbaum

[57] ABSTRACT

A multilink intercom is disclosed having hands free answer capability on each of the links. The circuit is arranged for use with the standard key telephone system and is station oriented such that concurrent hands free communication connections can be utilized on each of the links. A common selector is used to serve all of the links and the hands free detector and control circuitry at each station is shared among all of the intercom lines at that station.

11 Claims, 8 Drawing Figures

FIG. 6 VOICE CCT 60 (PORTION OF HANDS FREE ANSWER UNIT)

KEY TELEPHONE SYSTEM MULTILINK HANDS FREE ANSWER CIRCUIT

FIELD OF THE INVENTION

This invention is directed to a key telephone multilink intercom having hands free answer capability and more particularly to an arrangement for using a selector common to all of the links for control purposes.

BACKGROUND OF THE INVENTION

As it is commonly understood, hands free answer capability enables a telephone subscriber to answer an incoming call without physical manipulation of the telephone set. Thus, answering is accomplished simply by speaking a reply. The spoken work is then "picked-up" by an activated microphone and the answer is transmitted back to the calling party. Such a feature is finding acceptance in key telephone systems for use on the intercom link. U.S. Pat. No. 3,743,791 issued July 3, 1973 to Duff-Simon is directed to such a feature, which is implemented in a single link intercom. Some key telephone systems, however, are large enough to support a mutilink intercom where concurrent communication connections may be established between several telephone stations. Under such a situation an incoming call can arrive at a telephone station on any one of a number of links.

This poses a problem in that, without hands free answer capability the subscriber would push the key associated with the activated calling intercom link. This key operation would serve to connect the transmitting and receiving network with the selected calling intercom link. With hands free answer capability it is precisely this manual operation which is eliminated. Thus, it is desirable to arrange such a system so that at the calling station the calling intercom link is automatically selected and the microphone activated and connected to the proper intercom link, all without manual involvement on the part of the subscriber.

A further object of the invention is to arrange such a hands free answer feature in a manner that, notwithstanding the fact that the switchhook or pickup keys at the called station remain unactivated by the subscriber, only one call at a time may be completed to a called station.

A still further object of the invention is to control such a hands free answer feature in a manner to allow multilink intercom operation using as much common equipment as possible and arranged in a manner so that stations equipped with hands free answer capability are entirely compatible with stations not so equipped and such that station users may, from time to time, elect to bypass the hands free answer feature.

SUMMARY OF THE INVENTION

These and other objects of my invention are achieved in an embodiment of a key telephone multilink intercom hands free answer circuit which is station oriented such that each key telephone station having hands free answer capability contains a separate control circuit. The multilink system operates with a common selector activated when a calling station goes off hook on a selected one of the intercom links. When the selector becomes associated with a particular link the line lamps at all of the stations associated with that link flash. Called station identification digits are transmitted from the calling station to the selector and the selector, in response to these digits, directs ringing signals to the selected called station over the active intercom link.

Since the hands free answer microphone and speaker at each station are common to all of the links a determination must be made as to which link an incoming signal is arriving on. This is accomplished by a circuit which monitors the flashing lamp signals to determine which is currently in the active calling state. Upon the joint detection of ringing signals and lamp flash signals the hands free answer circuit at the selected called station is activated. Once the intercom connection has been established a control signal is provided to drop the selector from the connection so that the selector is available for establishing connections on any other link. During the period that an intercom call is established to a called station on one link, calls on any other intercom link to that same station are inhibited. Accordingly, it is one feature of my invention to provide a hands free answer intercom system which is usable on several independent links, while at the same time using a common microphone and speaker at the called station.

It is a further feature of my invention to provide a multilink hands free answer arrangement whereby the called subscriber may switch from hands free answer to normal intercom communication at any time or the subscriber may deactivate the hands free answer feature prior to an incoming intercom call.

BRIEF DESCRIPTION OF THE DRAWING

The operation and utilization of the present invention will be more fully apparent from the following description of the drawing, in which.

GENERAL DESCRIPTION

Figure 1:
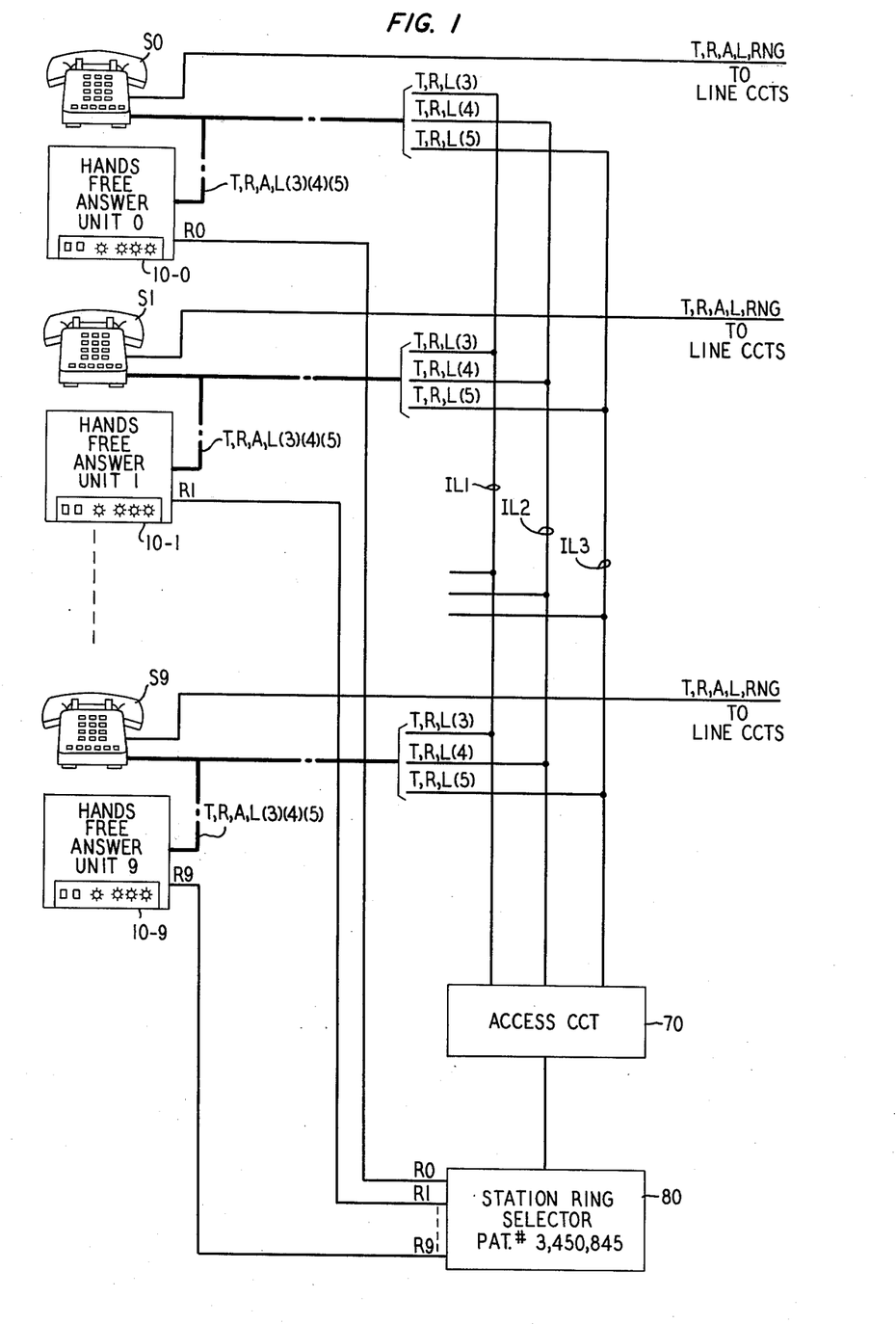
FIG. 1 shows in block diagram form several telephone stations each having associated therewith a hands free answer unit and each connected to three intercom links.

In FIG. 1 there is shown three intercom links, IL1, IL2 and IL3, interconnecting stations S0 though S9. Associated with each station is a hands free answer unit and common to all of the links and to all of the stations is station rings selector 80. Access circuit 70 serves to provide access for each of the links to the common selector while at the same time serving to provide talking battery and lamp control for each of the links. The precise manner in which access circuit 70 performs these functions will be set forth in greater detail hereinafter.

Figure 2:
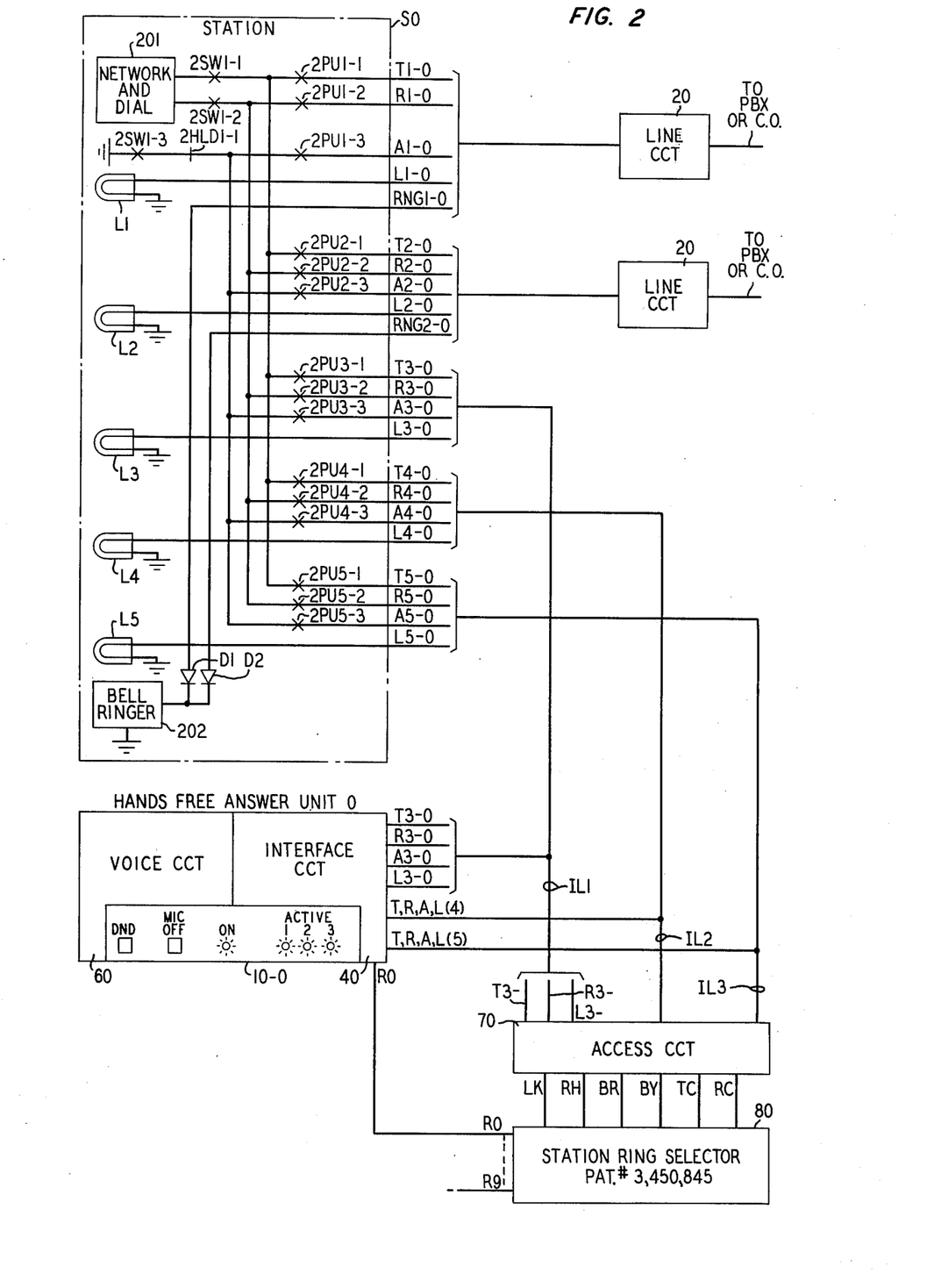
FIG. 2 is a schematic showing the details of a station circuit.
Figure 3:
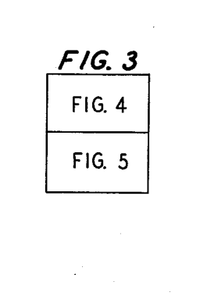
FIG. 3 shows the arrangement of FIGS. 4 and 5.

When a calling station such as station S0 goes off-hook and operates one of the keys associated with an idle intercom link, such as link IL1, access circuit 70 responds by providing lamp flash signals to each of the stations having access to that link. Thus, as shown in FIG. 2, assume station S0 goes off-hook and operates pickup key 3PU3 associated with intercom link IL1. Access circuit 70 provides, over lead L3-0, a flash signal to operate lamp L3 at each station in a flashing mode thereby signifying that an intercom call is being established on intercom link IL1. Calling station S0 then dials the digits associated with the called station. These digits are provided via access circuit 70 to station ring selector 80, and in the manner to be detailed hereinafter a signal is provided over a selected lead R0 through R9 to the hands free answer unit associated with the called station. Thus assuming the called station is station S9 a signal is provided over lead R9 to hands free answer unit 10-9 (shown in FIG. 1). Hands free answer circuit 10-9 in response to the signal on lead R9 provides a momentary tone on its associated speaker to alert the subscriber at station S9 that an intercom call has just been established.

The called hands free answer unit 10-9 operates in response to receipt of a signal on the R-9 lead and to lamp flash signals on one of the three intercom lamp leads to become associated with the calling link which in this case is link IL1. A lamp on the hands free answer unit indicates which of the links the unit has become associated with and a signal is returned to the station ring selector 80 to release that selector while the active intercom link is maintained active. The calling suscriber at station S0 may then communicate via network 201 and the handset of station S0 via intercom linl IL1 to the speaker of hands free answer unit 10-9. The called subscriber may respond to the intercom call simply by speaking into the microphone of the hands free answer unit 10-9 and need not manipulate any of the keys at station set S9. Thus bidirectional communication, with the subscriber at station S0 speaking and hearing via the normal handset and the subscriber at station S9 speaking and hearing via the auxiliary hands free answer unit, is possible. Since the subscriber at station S9 is not required to manipulate any of the keys at station set S9 that subscriber may engage in an incoming intercom connection while at the same time being engaged in a communication connection with any of the other lines associated with that station. Thus there is no need for a called subscriber who is otherwise engaged in a telephone communication on an active CO or PBX line to place the active communication connection in the hold mode in order to answer an intercom connection. This feature is desirable in situations where the incoming intercom connection serves to announce visitors or calls incoming on other lines without requiring an interruption in the present conversation on the active line.

DETAILED DESCRIPTION

Continuing in FIG. 2 and assuming that station S0 desires to establish an intercom connection to station S9 via link IL1, pickup key 2PU3 would be operated and the station would go off-hook. Under such a condition network and dial 201 is connected via enabled switchhook contacts 2SW1-1 and 2SW1-2 and enabled pickup key contacts 2PU3-1 and 2PU3-2 over leads T3-0 and R3-0 to access circuit 70. The lamp contact lead L3-0 is also extended to access circuit 70. The A3-0 lead extend ground via enabled switchhook contact 2SW1-3, released hold break contact 2HLD1-1 and enabled pickup key contact 2PU3-3 to the associated hands free answer unit 10-0.

Figure 7:
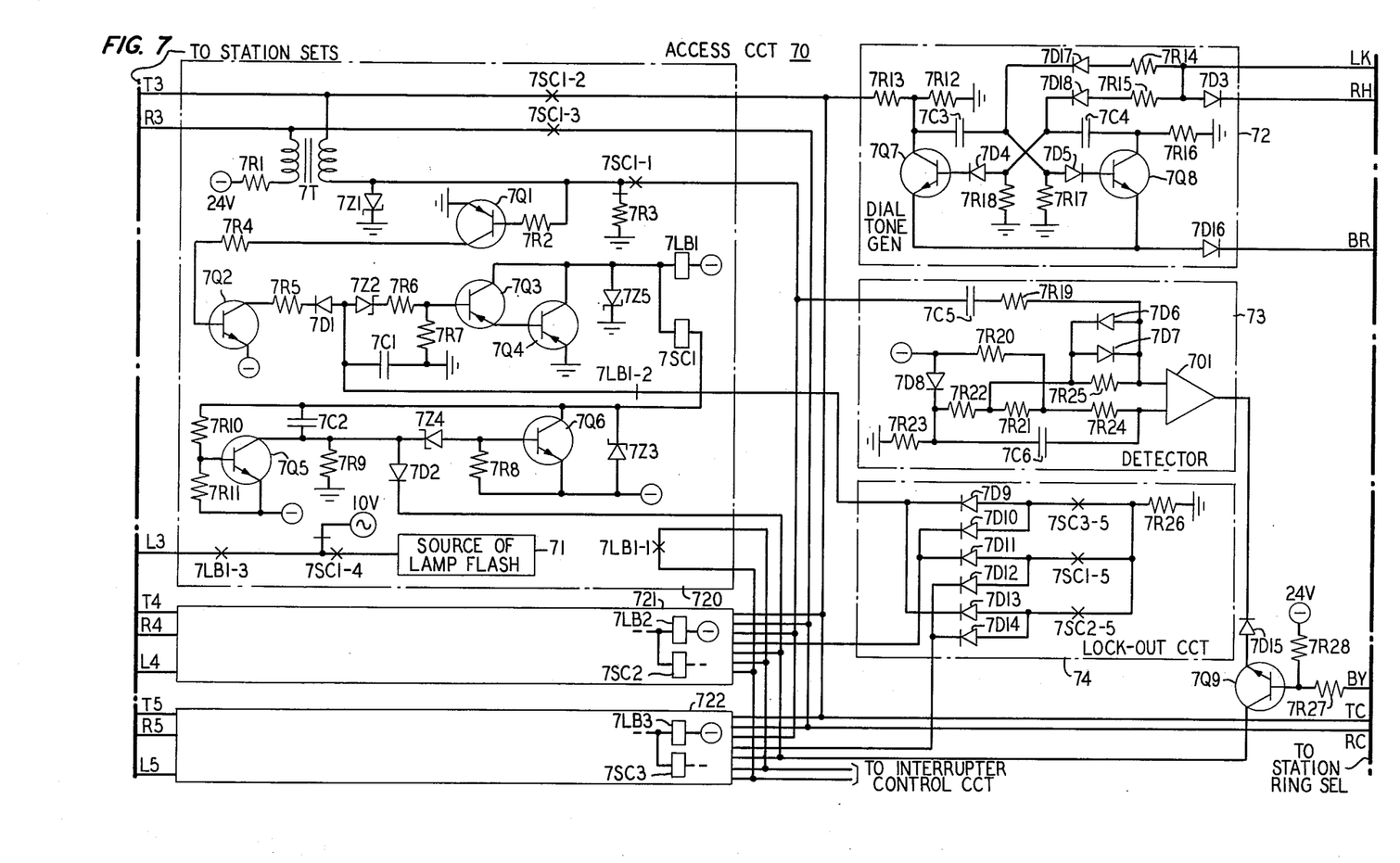
FIGS. 7 and 8 show in schematic form the common selector and selector access circuit.

As shown in FIG. 7 when network LD1 is connected across leads T3- and R3-, loop current is drawn via battery through resistor 7R1 and one winding of inductor 7T and over the R3- lead back to station S0, through network and dial circuit 201, and back over lead T- and via the other coil of inductor 7T to ground through resistor 7R2 and transistor 7Q1. Transistor 7Q1 turns on thereby turning on transistor 7Q2. The voltage across capacitor 7C1 increases until zener diode 7Z2 breaks over turning on transistors 7Q3 and 7Q4 thereby operating relays 7LB1 and 7SC1. Relay 7SC1 operating connects lead T3- through enabled make contact 7SC1-2 to dial tone generator 72, which generator can be arranged in the manner shown or in any well-known manner operable to provide distinctive voltage signals. Thus when station S0 goes off-hook and enables the intercom link a connection is established via the access circuit to the dial tone circuit, which is disabled at this point.

As shown in FIG. 7 relay 7SC1 operates because the bistable circuit composed of transistors 7Q5 and 7Q6 automatically sets itself so that transistor 7Q6 is saturated. This occurs because the base drive for transistor 7Q5 is supplied through the coil of relay 7SC1, hence if transistors 7Q3 and 7Q4 are off there is no base drive to transistor 7Q5 and it remains off. With transistor 7Q5 off, base drive is supplied to transistor 7Q6 through resistor 7R9 and breakdown diode 7Z4. Therefore transistor 7Q6 saturates and locks up the bistable circuit. When relays 7SC1 and 7LB1 both operate, lamp flash signals are provided from lamp flash circuit 71 via enabled make contact 7SC1-4 and enabled make contact 7LB1-3 over lead L3- to all of the stations S0 through S9 causing the lamps associated with intercom line IL3 to pulse. In addition, this pulsating voltage is extended to the hands free answer unit associated with each of the stations. As will be seen it is this lamp flash signal which is extended to all of the stations in association with a signal which is extended only to the called station which allows the hands free answer unit at the called station to become associated to the calling one of the links.

Note that when relay 7SC1 operates ground is provided via resistor 7R26 and enabled make contact 7SC1-5 and diodes 7D11 and 7D12 to maintain relay 7SC2 associated with link IL2 and relay 7SC3 associated with link IL3 inactive. This occurs as shown in FIG. 7 with respect to link IL1 by preventing capacitor 7C1 from charging in the respective circuits thereby preventing the respective Darlington pair from operating. This insures that the access circuit becomes associated with only one link at a time.

Figure 8:
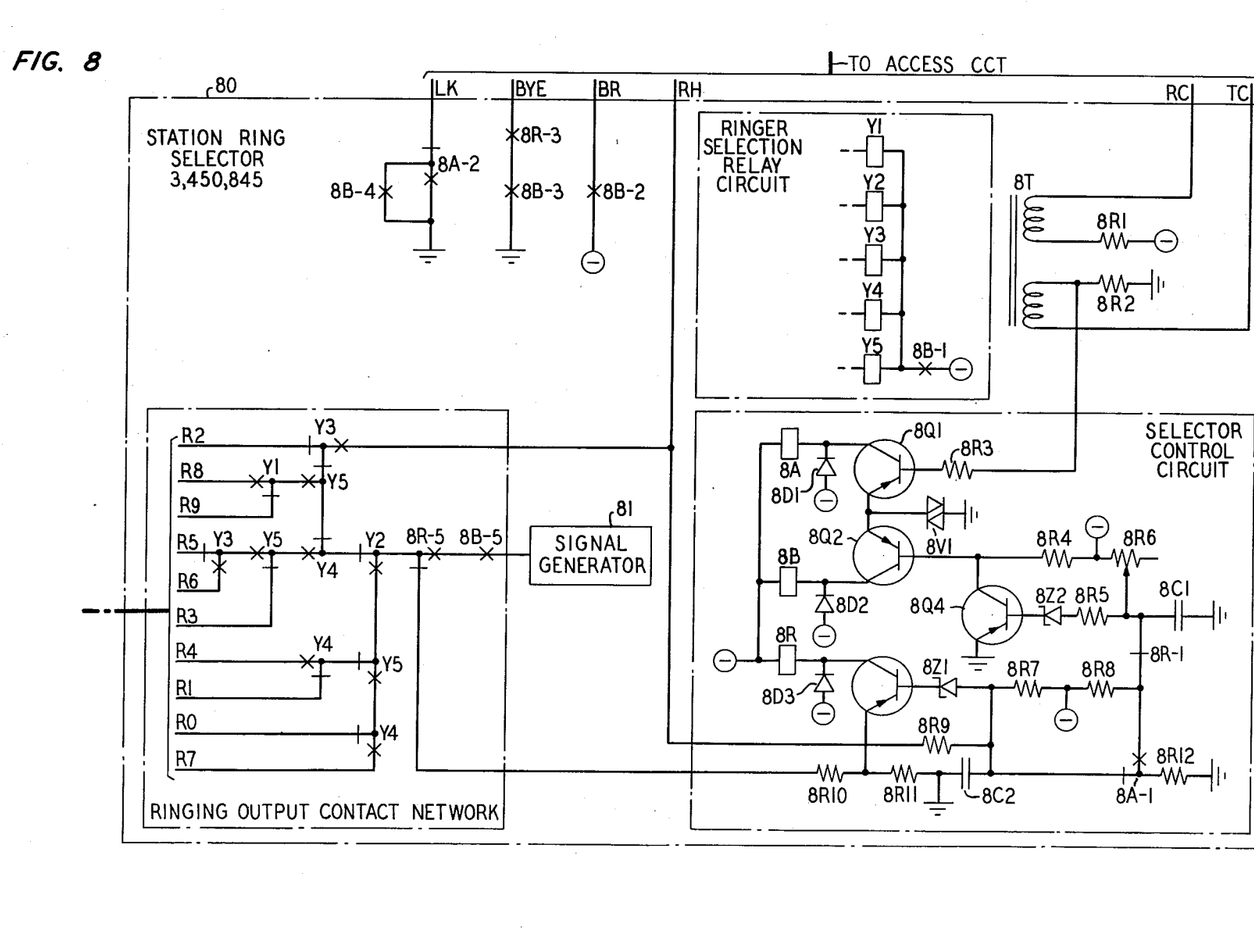

In addition to the foregoing, when relays 7SC1 and 7LB1 operate the T3- and R3- leads are extended via enabled make contacts 7SC1-2 and 7SC1-3 and over leads TC and RC to station ring selector 80, FIG. 8. As shown in FIG. 8, the connection of the calling station to leads TC and RC serves to turn on transistor 8Q1 thereby operating relays 8A and 8B. Relay 8B operating provides negative potential via enabled make contact 8B-2 over lead BR to FIG. 7 thereby turning on the dial tone generator.

The calling subscriber, upon hearing dial tone, begins to dial the digit of the called station. This digit information which, in the example cited is the digit 9, is transmitted over the T3- and R3- leads to station ring selector 80, FIG. 8. The ring selector 80 operates in the manner as described in C. E. Morse U.S. Pat. No. 3,450,845. Thus when relay 8A releases at the beginning of the dialed pulses, a ground is provided over lead LK to access circuit 70 and via diode 7D3 this ground is returned over lead RH to prevent relay 8R from operating. When rotary dialing (or multifrequency dialing) is completed relay 8A remains operated and relay 8R operates.

When relays 8A, 8B and 8R operate signifying the receipt by station ring selector 80 of the full dialed digit, which in this case is digit 9, a ringing signal is provided from signal generator 81 and enabled make contacts 8B-5 and 8R-5 and over the R9 lead (the Y- relays are set as discussed in the Morse patent) to the hands free answer unit associated with the called station.

Figure 4:
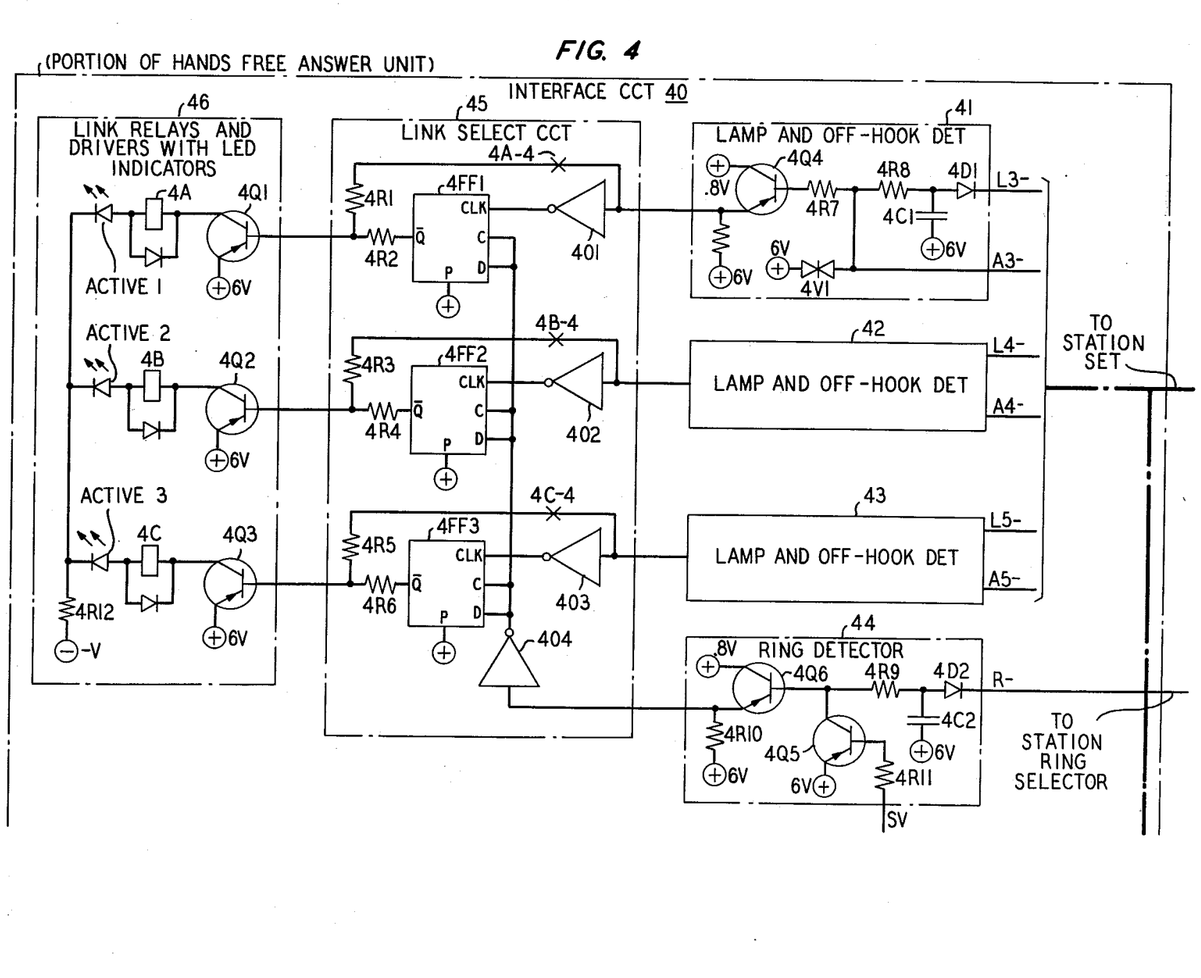
FIGS. 4, 5 and 6 show in schematic form the hands free answer control unit.

Turning now to FIG. 4, a typical hands free answer circuit is shown. There is one such circuit for each station and for clarity all have not been shown.

Digressing momentarily, it will be recalled that when the calling station went off-hook on the intercom link lamp flash signals were transmitted from access circuit 70 over the L3- lead which lead is the lamp lead associated with the first intercom link. These lamp flash signals were communicated to all of the hands free answer units and thus lead L3 for interface circuit 40 (FIG. 4) has lamp flash signals impressed thereon. In the situation where interface circuit 40 is associated with the calling station (station S0) ground would appear on the A3 lead from the associated calling station, in the manner described previously. This ground operates to maintain the base of transistor 4Q4 low regardless of the voltage impressed upon lead L3. Thus when interface circuit 40 is associated with a calling station transistor 4Q4 is on continuously thereby maintaining the output of amplifier 401 continuously low.

In the situation where interface circuit 40 is associated with the called station the associated A3 lead does not have ground thereon and the lamp signals which are communicated to all of the hands free answer units over lead L3 cause the associated transistor 4Q4 to turn off and on, thereby causing the output of amplifier 401 to also go high and low. Thus in every interface circuit, except the interface circuit associated with the calling station, the output of the amplifier 401 associated with the calling line would be acting as a clock pulse to the associated flip-flop 4FF1. The flip-flops 4FF1, 4FF2 and 4FF3 in each of the interface circuits are D-type flip-flops which require a concurrent clock pulse and a high on the D lead in order to operate the Q or Q output associated with a particular one of the flip-flops 4FF1, 4FF2 and 4FF3.

Flip-flop 4FF1 operates when the calling party is on link IL1. Flip-flop 4FF2 operates when the calling party is on link IL2 while flip-flop 4FF3 operates when the calling party is on intercom link IL3, all assuming that this hands free answer circuit is associated with the called station as determined by a signal on the associated R lead. Relays 4A, 4B and 4C and their associated light-emitting diodes are associated with flip-flops 4FF1, 4FF2 and 4FF3, respectively. When any of these relays operate it is maintained operate via resistor 4R1 (4R2 or 4R3) and enabled make contact 4A-4 (or 4B-4, 4C-4 in the event of links 2 and 3). As will be discussed when one of the relays 4A, 4B or 4C operate, a signal is sent to the selector circuit releasing that circuit and at the same time removing the lamp flash signal and substituting therefor a continuous signal. To maintain this continuous signal on lead L3 causes the output of lamp and off-hook detector 41 to stay low thereby maintaining the operate link relay in the operating condition.

In the situation where interface circuit 40 is associated with the called station, ringing signals from the selector circuit are applied via the R- lead. These ringing signals are rectified via diode 4D2 and capacitor 4C2 and provided via resistor 4R9 to the base of transistor 4Q6. Assuming transistor 4Q5 to be off, the rectified ringing signal causes the output of transistor 4Q6 to pulse, which pulse is transmitted via inverter 404 to the D inputs of each of the three flip-flops 4FF1, 4FF2 and 4FF3. Since the clock input of flip-flop 4FF1, as previously discussed, is active, flip-flop 4FF1 sets, causing transistor 4Q1 to turn on thereby operating relay 4A. Current flows from transistor 4Q1 and through the coil of relay 4A through light-emitting diode ACTIVE 1 to battery via resistor 4R12. Current flowing through the light-emitting diode causes that diode to become illuminated as an indication to the calling subscriber that a call has been established to that station on intercom link IL1.

Note that only the clock input of the flip-flop associated with the currently active intercom link was operative and thus the call is established only on the active intercom link. Thus, even though the hands free answer unit is common to all of the links, it only becomes associated in the operative mode, with the active link. Note also that while every hands free answer station, other than the calling station, has an active clock lead, only the hands free answer unit associated with the selected called station becomes active. In the situation where the interface circuit had already been associated with another link on a previously established connection transistor 4Q5 would be on thereby inhibiting the extension of ringing signals to transistor 4Q6, thereby preventing the called hands free answer unit from becoming activated on two links simultaneously. Transistor 4Q5 is on when the link is busy from battery supplied to its gate via resistor 4R11 and over lead SV from FIG. 5, power supply circuit 55. This negative potential is supplied when any of the relays 4A, 4B or 4C associated with this hands free answer circuit is operated.

Figure 5:
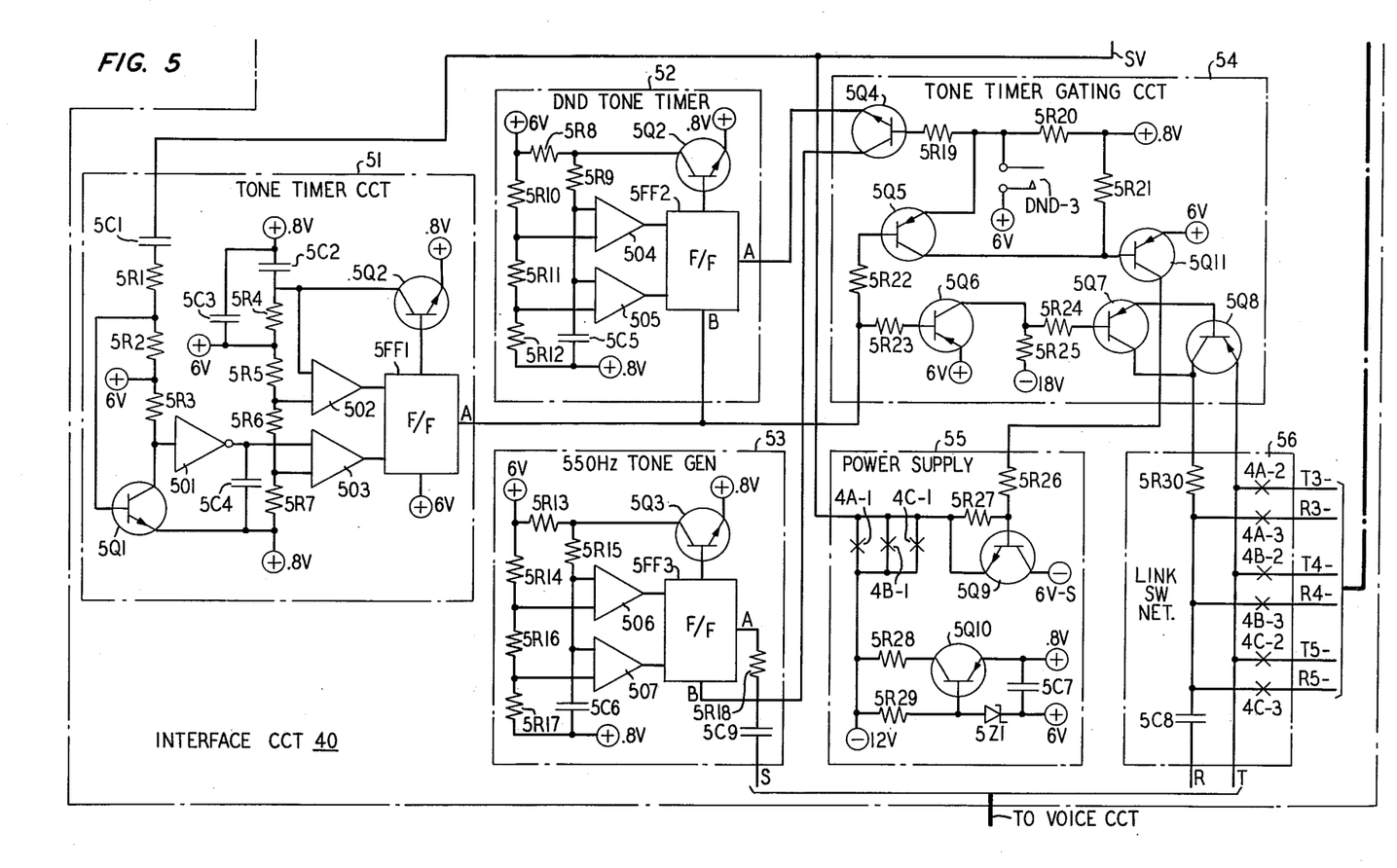

Continuing in FIG. 5, when relay 4A operates negative battery is supplied to the input of tone timer circuit 51, which circuit is designed in any one of the well-known circuit configurations as a monostable device, which upon presentation of a change in voltage provides a change in output for a specific period of time. Thus, when the input at capacitor goes negative, the A output of flip-flop 5FF1 goes from low to high for one-half second. This momentary high is provided to the B input of tone timer 52, which timer is designed as a ½ Hz multivibrator such that while the input at B stays high, the output at A provides a 3 Hz signal. Tone timer 52 may be arranged as well known in the art to provide such a function. The output from flip-flop 5FF1 is also communicated to tone timer gating circuit 54 and via resistor 5R22 to the base of transistor 5Q5. The emitter of transistor 5Q5 goes from low to high and, assuming the DO NOT DISTURB key (DND) is unoperated, causes the base of transistor 5Q4 to go from low to high. Transistor 5Q4 is arranged to operate in the reverse direction such that the high on the base is communicated via the collector to the B input of tone generator 53 causing flip-flop 5FF3 to provide at its A output a 550 Hz tone. This tone is communicated via resistor 5R18 and capacitor 5C8 to lead S. This tone continues so long as flip-flop 5FF1 stays high which, as discussed previously, is a period of ½ second. The tone signal on lead S is communicated to voice circuit 60, FIG. 6, and is provided to speaker 62 via the circuitry shown. Thus the subscriber at the called station hears the distinctive 550 Hz tone over the speaker of the called hands free answer unit. The same tone is communicated via lead S and transformer 6T on the T and R leads back to the interface circuit and via link switch network 56 and enabled make contacts 4A-2 and 4A-3 over the tip and ring leads to the calling station.

Digressing momentarily, in the event that the subscriber at the called hands free answer station had previously operated the DO NOT DISTURB (DND) key, several things would have happened slightly different. First, positive voltage would appear on the base of transistor 5Q4 (FIG. 5) thereby causing that transistor to follow the 3 Hz output of flip-flop 5FF2 such that the input to tone generator 53 would be ON for a short period and OFF for a short period, resulting in several bursts of 550 Hz tone being supplied on the S lead. Thus, instead of the tone which is heard by the calling and called subscriber being a continuous 550Hz, it would be an interrupted 550 Hz tone. The second thing that happens when the station is in the DO NOT DISTURB mode is that the base of transistor 5Q11 of tone timer 54 has provided thereto positive voltage via resistors 5R20 and 5R21. Thus, when flip-flop 5FF1 returns low, drive is removed from the base of transistor 5Q5 removing drive from the base of transistor 5Q11 turning that transistor off thereby turning transistor 5Q9 in power supply 55 off, which in turn turns off the switched voltage 6V-S, which in turn inhibits, in the manner to be described, the station hands free answer unit from receiving or from communicating.

During the ½ second that flip-flop 5FF1 is on, the base of transistor 5Q6 in tone timer 54 is high causing the Darlington pair 5Q7 and 5Q8 to turn on, thereby causing resistor 5R30, which advantageously can be a 200 ohm resistor, to become connected across the T and R leads via enabled make contacts 4A-2 and 4A-3. This resistance across the T and R leads is detected by access circuit 70, FIG. 7, detector 73, which detector is designed to monitor the impedance of the tip and ring leads and to provide an output via amplifier 701 whenever the impedance drops to a predetermined level. Detector 73 is designed such that it does not provide an output when one station, the calling station, is on the tip and ring leads but provides an output when any second station goes off-hook or when the hands free answer unit associated with any station becomes activated. The output of detector 701 causes the selector to drop off the circuit via the BY lead thereby allowing station ring selector 80 to become available for connection to any other link.

As shown in FIG. 7, when detector 73 provides an output signal transistor 7Q9 turns off thereby turning off transistor 7Q6 which, in turn, causes relay 7SC1 to release. Relay 7SC1 releasing removes the connection from the T3 and R3 leads to the station select circuit, FIG. 8, removes the ground from lockout circuit 74 and changes the signal on lamp lead L3- from flashing to a solid ON condition. Thus at this time both access circuit 70 and station ring selector 80 are available to establish intercom connections on any nonbusy intercom link.

Figure 6:
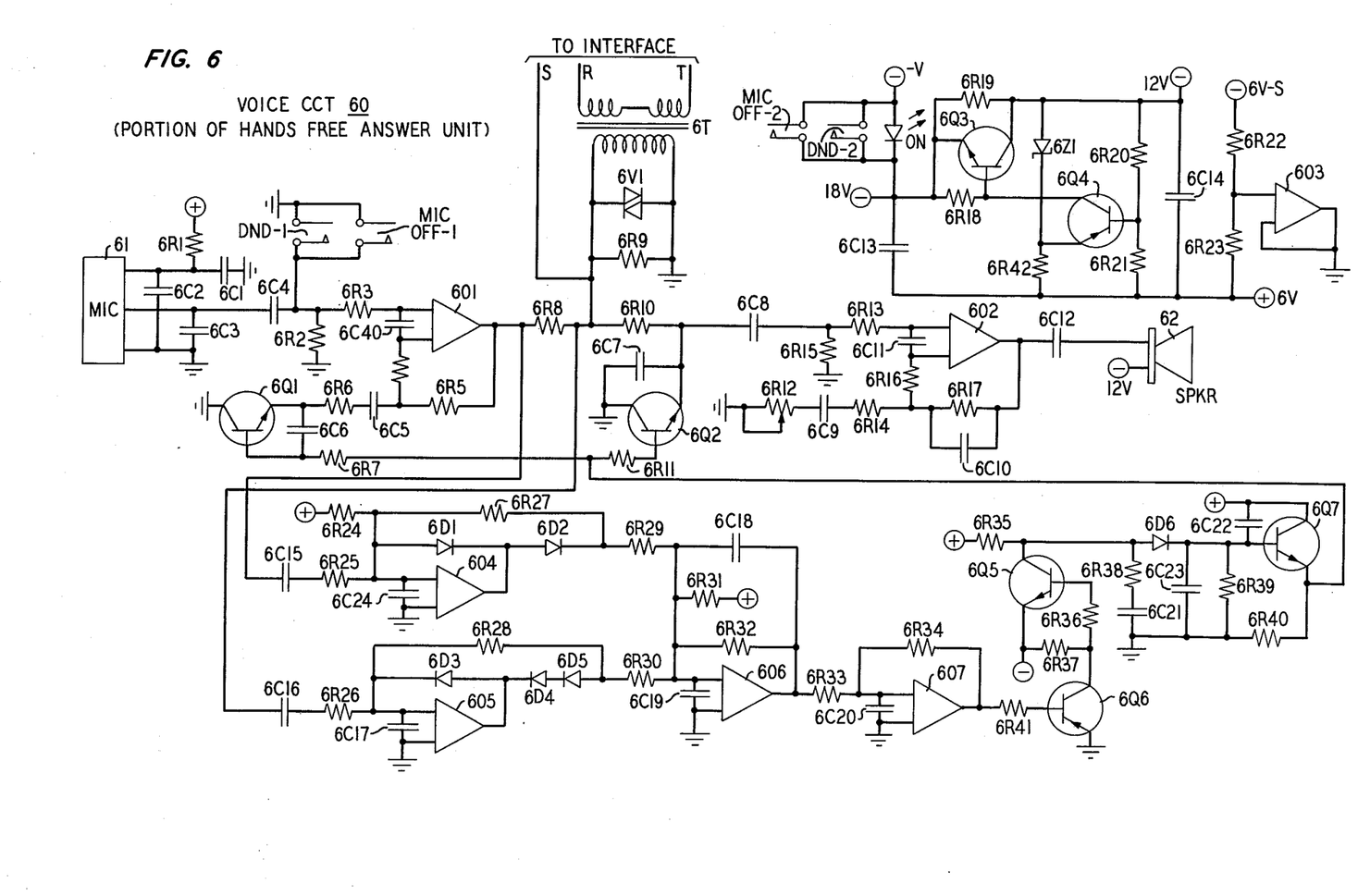

Returning now to FIG. 5, once flip-flop 5FF1 returns low, the tone is removed from lead S and, if the DO NOT DISTURB key is not operated the called station can respond without any manipulation of a key and without removing the handset simply by speaking into microphone 61, FIG. 6. This communication is extended via voice circuit 60 back via transformer 6T and over the T and R leads through the interface circuit, FIG. 5, and via enabled make contacts 4A-2 and 4A-3 to the calling subscriber. The calling subscriber uses the conventional handset and communicates to the called station over the same T and R leads. This communication is extended via transformer 6T, FIG. 6, and speaker 62 to the party at the hands free answer station.

Voice circuit 60 serves to control communication such that communication picked up via microphone 61 is communicated to the T and R leads and such that communication from speaker 62 is inhibited from being picked up and rebroadcast. This operation can be by the circuitry shown in FIG. 6, which is fully described in copending patent application of V. E. Munson. The circuitry of FIG. 6 is attributed to the inventorship of V. E. Munson but it is noted that other designs also provide a similar function.

As shown in FIG. 6 the calling subscriber may, by operation of the MICROPHONE OFF key (MIC-OFF), inhibit the operation of local microphone 61. This is accomplished simply by placing ground via contact MIC-OFF-1 on one side of capacitor 6C4. When the circuit is in the DO NOT DISTURB mode, ground is provided via contact DND-1 to capacitor 6C4 to disable microphone 61.

As discussed previously, when a call is completed to a station having hands free answer capability and the DO NOT DISTURB key has been operated, a distinctive tone is provided to the calling station. If the called station is equipped with hands free answer capability and is using the hands free answer circuitry on another link, tone is not provided to either the called or calling party. When a call is detected, and when the hands free answer station where the MIC-OFF key has been operated and the station is idle, a tone is provided to the calling and called stations. In the event the hands free answer unit is not provided to a station, the R-lead would be connected to the ringer of the called station or to a buzzer located in the called station and communication would proceed in the typical manner between the handsets of the calling and called parties.

CONCLUSION

While the embodiment shown is directed to a three link intercom, it should be noted that any number of links can be utilized by expanding the link circuitry of interface circuit 40. One skilled in the art may arrange a multilink hands free answer intercom to accomplish the same purpose by incorporating the hands free answer circuitry in the telephone console or in a separate console or by splitting the circuitry between the telephone console and the auxiliary console, all without departing from the spirit and scope of my invention.

What is claimed is:

1. A hands free answer control circuit for use in a key telephone system having a plurality of stations and a multilink intercom such that calling stations can communicate with selected called stations over the intercom link between them, said hands free answer control circuit adapted for association with each telephone station having hands free answer capability, each said hands free control circuit arranged for multilink operation and arranged to be enabled when the associated station is selected by a selector circuit common to all of the intercom links, each said hands free answer control circuit comprising means for detecting lamp flash signals transmitted via said selector circuit to all of the stations connected with the intercom link currently engaged by said selector circuit, means for detecting ringing signals transmitted via said selector circuit to said associated station, means jointly responsive to the detection of said ringing signals and the detection of said lamp flash signals at a called hands free answer station for enabling said associated hands free answer control circuit thereby providing hands free communication capability between said called station and a calling station over said engaged intercom link, and means responsive to said enabling means for releasing said selector circuit so that said selector circuit is available to establish intercom connections on any intercom link other than said engaged intercom link.

2. The invention set forth in claim 1 wherein said hands free answer control circuit includes means further responsive to said enabling means for momentarily providing a first distinctive audio tone.

3. The invention set forth in claim 2 further comprising means operative in response to said enabling means for inhibiting the establishment of subsequent intercom connections to said station over any other intercom link while a hands free intercom connection is established to said station over said engaged intercom link.

4. The invention set forth in claim 3 wherein said hands free answer control circuit comprises means for providing a do not disturb signal, and means responsive to the enabling of said do not disturb signal for inhibiting said hands free answer capability at said associated station.

5. The invention set forth in claim 3 wherein said hands free answer control circuit further comprises means jointly operative when said inhibiting means is enabled and when said control circuitry is enabled for momentarily providing a second distinctive audio tone.

6. The invention set forth in claim 2 wherein said hands free answer control circuit comprises means for providing a microphone off signal, and means responsive to the enabling of said microphone off signal and to the enabling of said hands free communication capability for inhibiting outward communication from said station while allowing inward communication to said station.

7. A multilink intercom system for use in a key telephone system having a plurality of stations, said multilink intercom system arranged such that bidirectional communications can be established between a calling station and a selected called station over a selected idle one of said intercom links, said multilink intercom system comprising a selector circuit common to all of said links and arranged to receive station directing signals from a calling station and to direct station ringing signals to the called station, means for transmitting lamp flash signals to all stations associated with a selected intercom link during the period when said selector circuit is active on that link, a plurality of intercom lamps at each station, each lamp associated with one of said intercom links, a handset at each station for transmitting and receiving sound signals over relatively short distances when the handset is removed from the station switchhook, a loudspeaker and microphone at each station for transmitting and receiving sound signals without manual manipulation of the handset or switchhook, a pickup key associated with each said intercom link operable to connect said handset to said associated intercom link, means at certain of said stations for detecting lamp flash signals directed to any said intercom lamp, means at certain of said stations for detecting ringing signals directed to said station, hands free answer control means operative jointly in response to the enabling of said lamp flash detecting means associated with one of said intercom links and to the enabling of said ringing detection means for enabling said associated loudspeaker and said microphone thereat, means responsive to said enabling of said loudspeaker and said microphone for momentarily applying a first audio signal to said loudspeaker, means enabled at the termination of said momentarily applied first audio signal for enabling bidirectional communications from the handset of the calling station to the microphone and loudspeaker of the called station, without regard to the status of the line pickup keys at the called station and means operative concurrently with said momentary tone applying means for releasing said selector so that said selector is available to direct calling connections on other idle links.

8. The invention set forth in claim 7 further comprising means operative in response to said enabling means for inhibiting the establishment of subsequent intercom connections to said station over any other intercom link while a hands free connection is established to said station over said engaged intercom link.

9. The invention set forth in claim 8 wherein said hands free answer control circuit comprises means for providing a do not disturb signal, and means jointly responsive to the enabling of said do not disturb signal and to the enabling of said loudspeaker and microphone for inhibiting said hands free answer capability at said associated station.

10. The invention set forth in claim 9 wherein said hands free answer control circuit further comprises means operative when said last mentioned inhibiting means is enabled for momentarily providing a second distinctive audio tone.

11. The invention set forth in claim 7 wherein said hands free answer control circuit comprises means for providing a microphone off signal, and means responsive to the enabling of said microphone off signal and to the enabling of said hands free communication capability for inhibiting the enabling of said microphone at said station while still enabling said loudspeaker at said station.

* * * * *